United States Patent
Wong et al.

[11] Patent Number: 5,928,316
[45] Date of Patent: Jul. 27, 1999

[54] FUSED FLOATING-POINT MULTIPLY-AND-ACCUMULATE UNIT WITH CARRY CORRECTION

[75] Inventors: Roney S. Wong, Sunnyvale; Shao-Kun Jiang, San Diego, both of Calif.

[73] Assignee: Samsung Electronics Co., Ltd., Rep. of Korea

[21] Appl. No.: 08/751,563

[22] Filed: Nov. 18, 1996

[51] Int. Cl.$^6$ ....................................................... G06F 7/38
[52] U.S. Cl. ............................................................ 708/501
[58] Field of Search ........................ 364/736.02, 748.07, 364/750.5, 748.05

[56] References Cited

U.S. PATENT DOCUMENTS

| | | | |
|---|---|---|---|
| 4,969,118 | 11/1990 | Montoye et al. | 364/748.07 |
| 5,241,493 | 8/1993 | Chu et al. | 364/748.07 |
| 5,375,079 | 12/1994 | Uramoto et al. | 364/786.04 |
| 5,471,410 | 11/1995 | Bailey et al. | 364/715.011 |
| 5,550,767 | 8/1996 | Taborn et al. | 364/715.04 |

OTHER PUBLICATIONS

Hokenek, Erdem et al, "Second–Generation RISC Floating Point with Multiply–Add Fused", *IEEE Journal of Solid–State Circuits*, vol. 25, No.5, Oct. 1990, pp. 1207–1212.

*Primary Examiner*—Ohuong Dinh Ngo
*Attorney, Agent, or Firm*—Skjerven, Morrill, MacPherson, Franklin & Friel LLP; Alan MacPherson; David T. Millers

[57] ABSTRACT

A fused floating point multiply-and-accumulate unit includes a multiplier which uses a modified Booth's algorithm to generate a sum and a carry representing a product of mantissas. An artifact of this algorithm is that the sum or carry may represent a negative value even though both mantissas are positive. The negative value may have a sign bit from sign extension or sign encoding of partial products in the multiplier. An artifact of the signed bit is a false carry out that results from canceling the sign bit. A 3-input adder simultaneously combines the sum and carry from the multiplier and performs the accumulation. The adder includes carry correction logic to suppress false carries and prevents a false carry from affecting more significant bits of the value being accumulated.

5 Claims, 6 Drawing Sheets

FUSED FLOATING-POINT MULTIPLY-AND-ACCUMULATE UNIT WITH CARRY CORRECTION

BACKGROUND OF THE INVENTION

1. Field of the Invention

This invention relates to digital arithmetic circuits and methods for performing a multiply-and-accumulate operation which determines (A*B)±C.

2. Description of Related Art

A multiply-and-accumulate (MAC) operation combines three values A, B, and C by adding or subtracting one value C to or from the product of the other values A and B. An arithmetic circuit including a multiplier and an adder can perform such MAC operations in separate steps, multiplying values A and B using the multiplier, rounding the result, and then adding value C to or subtracting value C from the product using the adder. Alternatively, fused MAC units perform portions of a multiplication and an accumulation in parallel and omit rounding of the product to improve processing performance (latency and accuracy) of MAC operations.

Hokenek et al., "Second-Generation RISC Floating Point with Multiply-Add Fused," IEEE Journal of Solid-State Circuits, vol. 25, No. 5, October 1990, which is hereby incorporated by reference in its entirety, describes a floating point MAC unit that performs bit alignment for value C in parallel with multiplication of values A and B so that value C is accumulated with product A*B without delay after determination of product A*B. A result A*B±C is accumulated without rounding or truncating intermediate product A*B which could introduce error. Additionally, a leading zero anticipator identifies a shift required to normalize the result A*B±C according for a floating point representation while value C is accumulated with product A*B so that the result A*B±C is normalized immediately after accumulation. Accordingly, a fused MAC unit is generally faster and more accurate than a multiplier and an accumulator used sequentially.

A drawback for fused MAC units is the increase in circuit complexity or size required for performing parallel operations, and fused MAC units which are less complex and/or smaller are sought.

SUMMARY OF THE INVENTION

In accordance with an aspect of the invention, a fused floating point multiply-and-accumulate unit includes a multiplier which uses a modified Booth's algorithm to generate a sum and a carry representing a product of mantissas. The modified booth algorithm can cause the sum or carry to represent a negative value even though both mantissas and the resulting product are positive. The negative value may have a sign bit from sign extension of partial products in the multiplier. Alternatively, both the sum and carry can have sign encoding bits. An artifact of the signed values is a false carry that results from canceling the sign of the negative value or the sign encoding. This false carry has no mathematical meaning and should not affect more significant bits when the product is accumulated with a third mantissa. In an embodiment of the invention, a 3-input adder simultaneously combines the accumulation value with the sum and carry from the multiplier. The adder includes carry correction logic to suppress false carries and prevent the false carries from affecting more significant bits of the accumulation.

In one embodiment of the invention, a multiply-and-accumulate unit includes a multiplier having output ports for sum and carry signals representing a product Ma*Mb of mantissas Ma and Mb and a 3-input adder with carry correction logic. The 3-input adder includes two adders where the first adder is a carry-save adder. The carry-save adder has two input ports coupled to the output ports of the multiplier, a third input port coupled to receive a first portion of a data signal representing a mantissa Mc for accumulation with product Ma*Mb. The first portion of mantissa Mc is the portion of that is aligned (i.e. has the same relative significance) as bits in product Ma*Mb. The second adder has input ports coupled to output ports of the carry-save adder. The carry correction logic is coupled to the first and second adders and suppresses a carry bit which results from addition of the carry and sum from the multiplier. The multiply-and-accumulate unit may additionally include an incrementer coupled to receive a second portion of the data signal so that the second portion can be incremented for a valid carry from the 3-input adder.

The carry correction logic can take a variety of forms. One form is used with a multiplier using sign encoding of partial products and includes an AND gate having input terminals coupled to the carry outputs of the first and second adders. For this embodiment, the multiplier must be such that the carry and sum when added together always generate a false carry as a result of canceling sign encoding. Accordingly, the adder always generates a false carry, and a valid carry only occurs if the two adder generates two carry bits.

Alternatively, if the multiplier generates sum and carry signals which only sometimes generate a false carry for sign cancellation, additional logic is provided on the inputs to the carry-save adder to determine if a false carry will be generated. If there is a false carry, the carry correction logic suppresses the false carry and only propagates the second carry generated. If there is no false carry, the first carry generated is valid and is propagated. One exemplary embodiment for this carry correction logic includes a NOR gate coupled to two input ports of the carry-save adder and an XOR gate coupled to the NOR gate and to the carry output from the first adder. The carry output from the second adder and the output from the XOR gate are coupled to input terminals of an AND gate which generates a corrected carry signal. Other exemplary embodiments are described below.

BRIEF DESCRIPTION OF THE DRAWINGS

Use of the same reference symbols in different figures indicates similar or identical items.

DETAILED DESCRIPTION OF THE PREFERRED EMBODIMENTS

A fused floating-point multiply-and-accumulate (MAC) unit in accordance with an embodiment of the invention determines a result A*B±C using a multiplier, an aligner, and a normalization circuit. The multiplier can be a modified Booth multiplier which either sign extends partial products to the length of the resulting product or sign encodes of the partial products. Sign encoding reduces the amount of adder circuitry required to combine partial products in the multiplier. In either alternative embodiment, the multiplier represents a product Ma*Mb of mantissas Ma and Mb as sum and carry values which are accumulated with a third mantissa Mc that can have a most significant bit (MSB) more significant than the MSB of product Ma*Mb. (As used herein, accumulation refers to either addition or subtraction.) Sign-extension circuitry and adder circuitry for the accumulation of bits more significant than the MSB of product Ma*Mb are eliminated by carry correction logic which determines whether the carry out is false (i.e. the result addition of a sign-extended negative value or a sign encoded value) and should be suppressed or is valid and should propagate to more significant bits. An incrementer can increment the bits of Mc which are more significant than the most significant bit of the product Ma*Mb in response to an valid carry out.

The aligner aligns mantissa Mc of value C for accumulation with a product Ma*Mb (the mantissa for product A*B) and is simplified by classifying each MAC operation according to the size of value C relative to product A*B as indicated by an exponent difference (Ea+Eb)−Ec where Ea, Eb, are Ec are respective exponents for values A, B, and C. Use of classes simplifies a shifter which shifts mantissa Mc as required for accumulation with mantissa Ma*Mb. For each class, the shifter may perform a fixed shift followed by a variable shift. For a first class, mantissa Mc is loaded as the MSBs in the shifter, and no fixed shift or variable shift are performed. Mantissa Ma*Mb provides "sticky" bits for rounding. For a second class, the shifter performs no fixed shift but shifts by a variable amount determined by subtracting the exponent difference from a constant. For third and fourth classes, a fixed right shift aligns mantissa Mc with mantissa Ma*Mb and the variable shift shifts further right by an amount indicated by an exponent difference (Ea+Eb)−Ec. Accumulation combines bits of mantissa Mc with bits from mantissa Ma*Mb. A fifth class shifts mantissa Mc to the least significant bits (LSBs) of the shifter with no variable shift, and mantissa Mc provides "sticky" bits which are ignored except for rounding mantissa Ma*Mb.

The normalization circuitry is also simplified by classifying each MAC operation according to the size of value C relative to product A*B as indicated by exponent difference (Ea+Eb)−Ec. Classes simplify a shifter in the normalization circuit that shifts a result for a coarse normalization because the shift range is reduced. Again, different classes either require no shift, only a fixed shift, or a fixed shift and a variable shift. The distance shifted in a variable shift is relatively small and depends on the exponent difference or leading zero/one anticipation.

Figure 1:
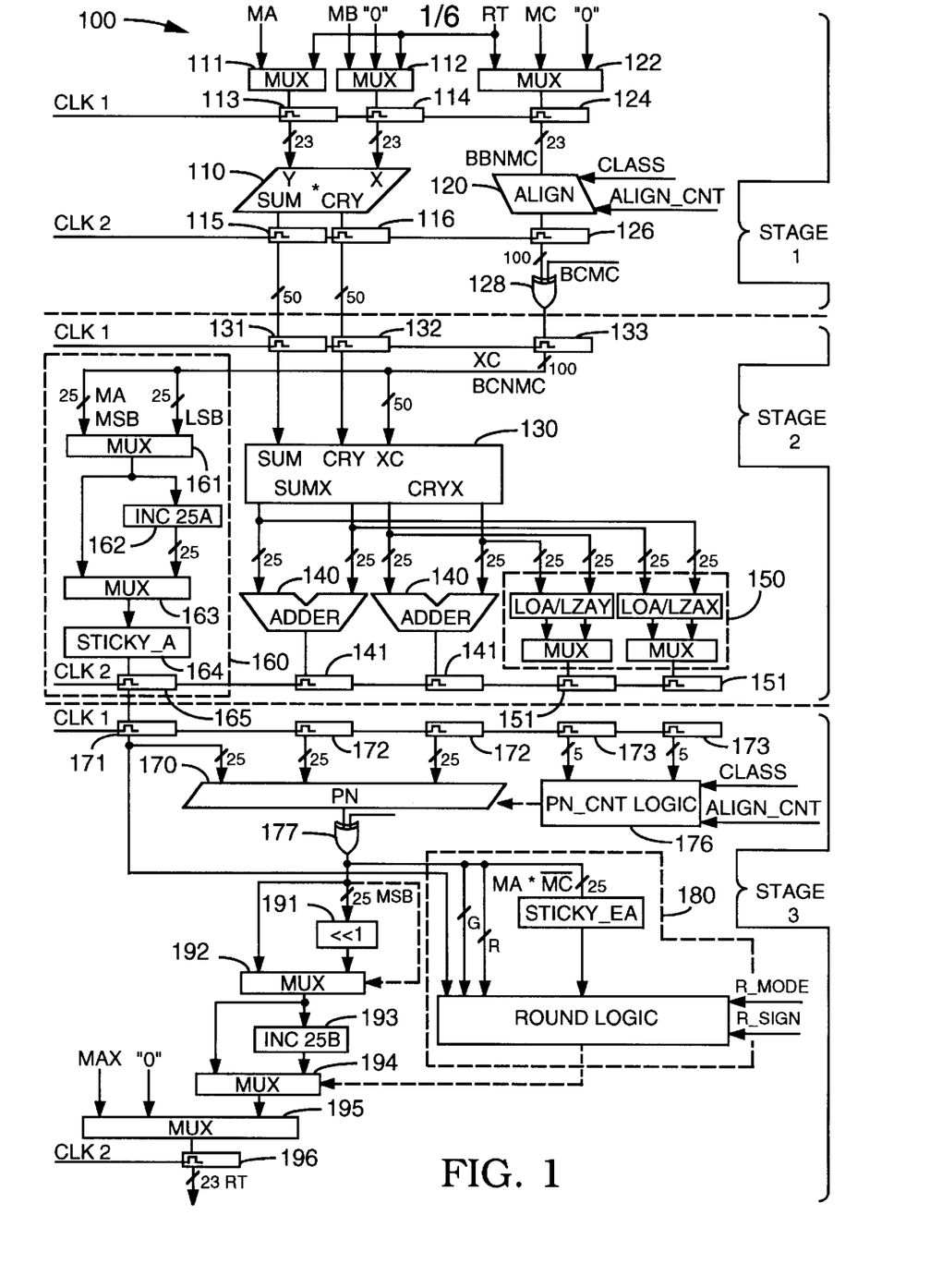
FIGS. 1, 2, and 3 are block diagrams respectively showing a mantissa pipeline, an exponent pipeline, and a sign pipeline for a fused floating point multiply-and-accumulate unit in accordance with an embodiment of the invention.
Figure 2:
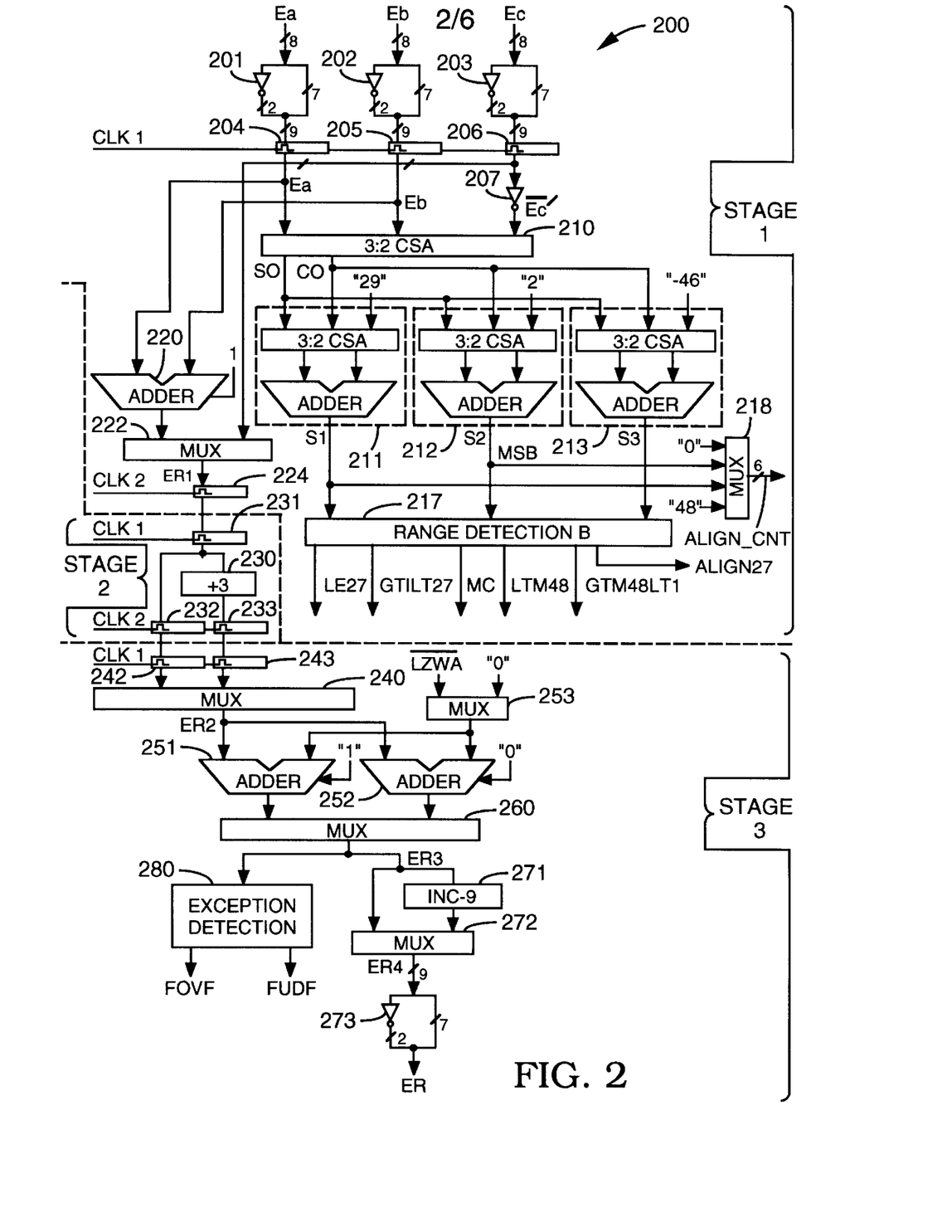
Figure 3:
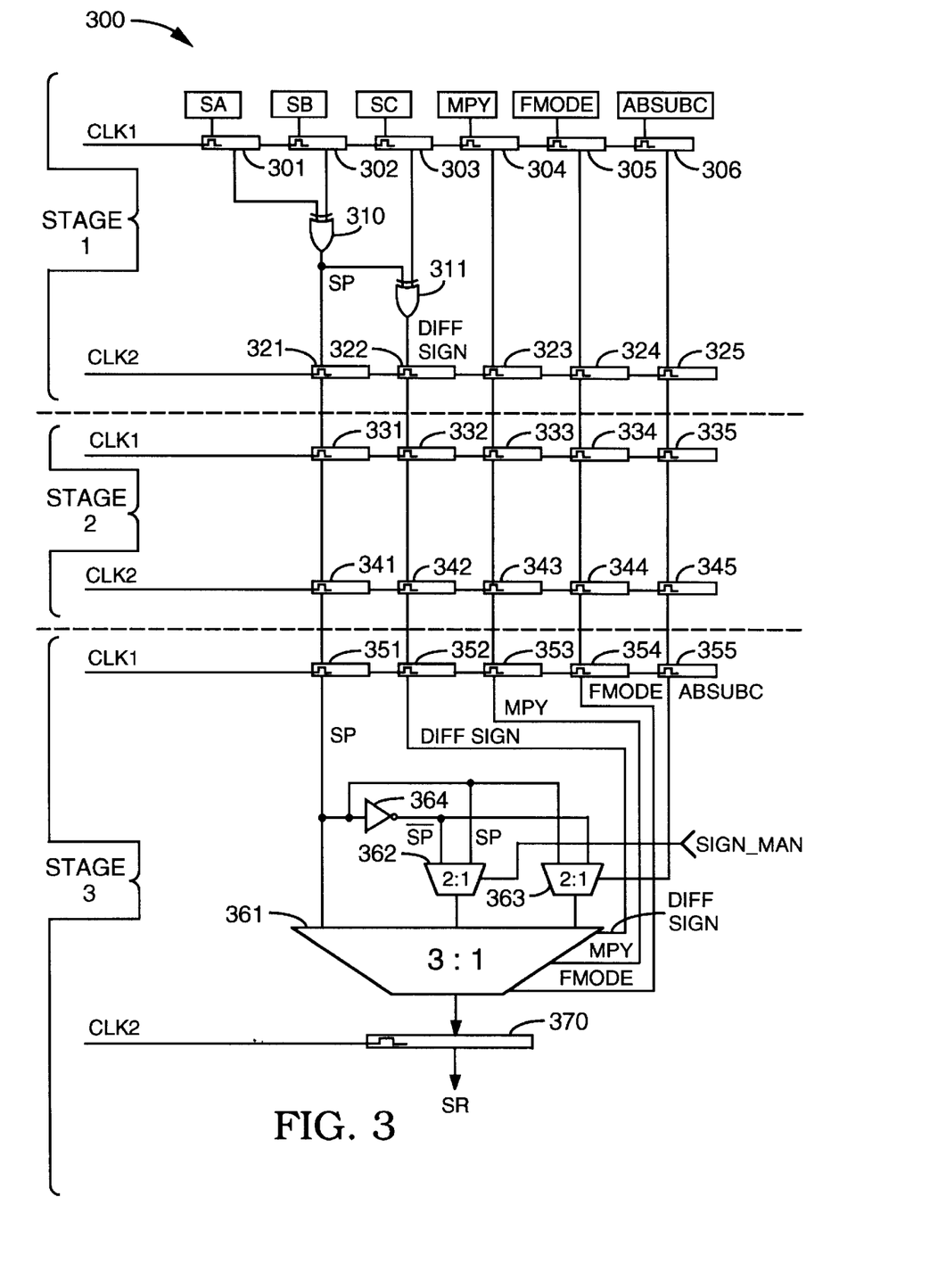

One embodiment of the invention is a fused MAC unit which determines (A*B)±C from input signals representing floating point values A, B, and C. Formats for floating point values are well known in the art. For example, the IEEE-754 single precision data type is represented using 32 bits that include one bit indicating a sign, eight bits indicating an exponent, and 23 bits indicating a mantissa. FIGS. 1, 2, and 3 show respective pipelines 100, 200, and 300 for mantissa, exponent, and sign data through an exemplary MAC unit which supports the IEEE-754 single precision data type. Mantissa pipeline 100 multiplies mantissas Ma and Mb for values A and B, adds or subtracts a mantissa Mc for value C, and normalizes a resulting mantissa RT according to IEEE-754 floating point format. Exponent pipeline 200 adds exponents Ea and Eb for values A and B and performs an exponent adjustment based on the results in mantissa pipeline 100. Further, in accordance with an aspect of the invention, exponent pipeline 200 determines exponent differences (Ea+Eb)−Ec and from the exponent differences determines classes for MAC operations. The classes are used in aligning mantissa Mc for accumulation with the product Ma*Mb and in normalization of mantissa result RT as described below. Sign pipeline 300 performs an XOR of sign signals Sa and Sb for values A and B to determine a sign SP for the product A*B and a sign difference DIFF_SIGN between sign SP and a sign Sc of value C. For addition, sign SP is the resultant sign SR unless the sign difference is not zero and the magnitude of value C is greater than the magnitude of the product A*B. For subtraction, sign SP is the resultant sign SR unless the sign difference is zero and the magnitude of value C is greater than the magnitude of the product A*B.

The exemplary MAC unit has three pipeline stages, a latency of three clock cycles, and can complete one MAC operation per clock cycle. Stage 1 determines product Ma*Mb and aligns mantissa Mc for accumulation with product Ma*Mb. Stage 2 accumulates mantissas Mc and product Ma*Mb and performs leading zero or leading one anticipation for normalization of the result of the accumulation. Stage 3 rounds and normalizes the result or detects overflow and underflow exceptions.

As shown in FIG. 1, stage 1 of mantissa pipeline 100 includes a multiplier 110 and an aligner 120 which operate in parallel. Multiplexers 111 and 112 and level trigger latches 113 and 114 select the input signals to multiplier 110. Signals CLK1 and CLK2 are the master and slave clock signals which control latches in the MAC unit. Multiplexer 122 selects the input signal to aligner 120. Input signals MA, MB, "0", RT and MC to mantissa pipeline 100 are in a 23-bit format to represent the mantissa of an IEEE-754 single precision value. Possible input signals to multiplier 110 include signals MA, MB, "0", and RT which respectively indicate mantissa Ma for value A, mantissa Mb for value B, the mantissa for one (1), and mantissa RT which was a previous result from the MAC unit. The 23-bit input signals represent a 24-bit normalized mantissa of the form 1.XXXXXXXXXXXXXXXXXXXXXXX where each X is 1 or 0 according to a corresponding bit from the 23-bit input signal. Accordingly, multiplexer 112 selects 23-bit signal "0" which represents a mantissa value of 1.0 during a floating point addition or subtraction (A*1)±C. Multiplexer 122 selects an input signal from signals RT, MC, and "0" which passes to latch 124 for processing by aligner 120. Signal "0" is selected when using the MAC unit to perform a multiplication A*B±0. In the following, selection of MA, MB, and MC is assumed although there are many other possibilities.

The implied leading 1 and a sign bit 0 are appended to each input signal before multiplier 110 determines the product of two 25-bit signed values. Multiplier 110 can have any desired multiplier architecture for multiplying integers (e.g. mantissas) at least 25 bits in size. Multiplier architectures are well known in the art. In the embodiment of the invention shown in FIG. 1, multiplier 110 generates a product in a single clock cycle and represents the product in the form of sum and carry signals SUM and CRY. Signals SUM and CRY must be added together to generate product Ma*Mb in two's-complement format. Product Ma*Mb should always be positive because mantissas Ma and Mb are positive. Sign pipeline 300 (FIG. 3) processes the signs of the floating point values.

Figure 4:
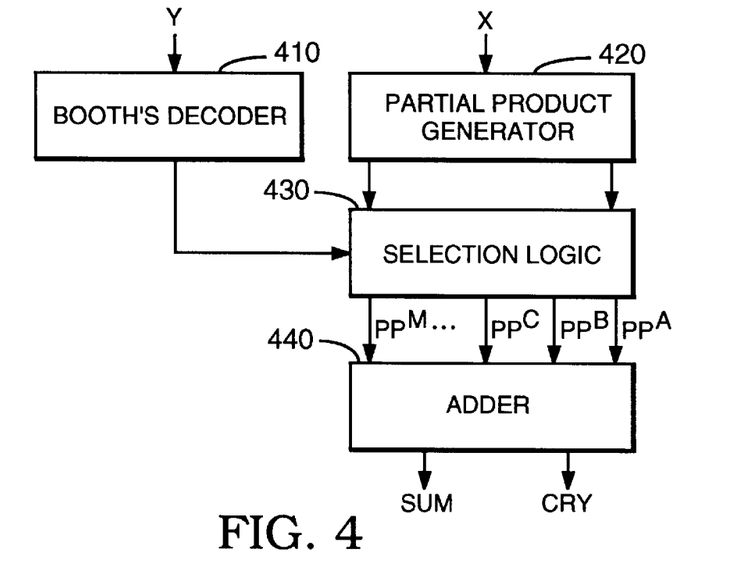
FIG. 4 is a block diagram of a multiplier for the mantissa pipeline of FIG. 1.
Figure 5:
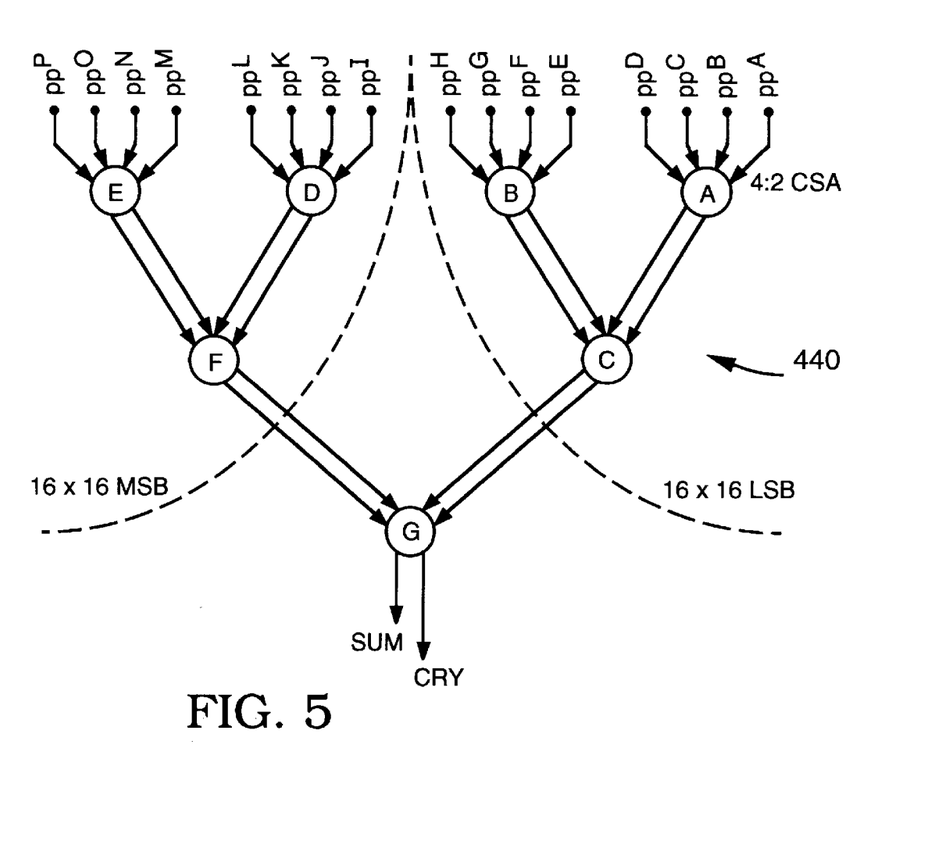
FIG. 5 is a block diagram of an adder for adding partial products in the multiplier of FIG. 4.

FIG. 4 shows an exemplary embodiment of multiplier 110 which includes a Booth decoder 410, a partial product generator 420, selection logic 430, and a carry-save adder 440. Booth decoder 410 in multiplier 110 recodes a multiplier Y while partial product generator 420 generates multiples of multiplicand X by performing shifts and two-complement or sign encoding operations. Selection logic 430 selects partial products ppA to ppM of multiplicand X according to the recoded multiplier Y and provides the selected partial products ppA to ppM to adder 440 for addition. Adder 440 may be a Wallace tree adder such as shown in FIG. 5 which reduces the partial products to two values: the sum and carry values represented by signals SUM and CRY.

Booth decoder 410 and selection logic 430 implement a modified Booth's algorithm which for each pair of bits $Y_{i+1}$, $Y_i$ in multiplier Y where i is even selects one of five multiples of $2^i*X$. The multiple selected for the partial product depends on the values of bits $Y_{i+1}$, $Y_i$, and $Y_{i-1}$ as shown in Table 1.

TABLE 1

Modified Booth's Decoding

| $Y_{i+1}$ | $Y_i$ | $Y_{i-1}$ | Selected Partial Product |
| --- | --- | --- | --- |
| 0 | 0 | 0 | $0*2^i*X$ |
| 0 | 0 | 1 | $1*2^i*X$ |
| 0 | 1 | 0 | $1*2^i*X$ |
| 0 | 1 | 1 | $2*2^i*X$ |
| 1 | 0 | 0 | $-2*2^i*X$ |
| 1 | 0 | 1 | $-1*2^i*X$ |
| 1 | 1 | 0 | $-1*2^i*X$ |
| 1 | 1 | 1 | $0*2^i*X$ |

For 32-bit signed integers, Booth's decoder 410 and selection logic 430 select up to 16 partial products ppA to ppP which adder 440 adds to generate signals SUM and CRY. Selection of partial product ppA uses a bit $Y_{-1}$ which is always 0. A multiplier Y which is a mantissa according to the IEEE-754 standard is a 24-bit unsigned (positive) value. After addition of a sign bit 0, the mantissas are 25 bit sign values which are sign extended to 26 bits for modified Booth decoding. The 26 bit values require 13 partial products ppA to ppM. U.S. patent application Ser. No. 08/734,277, entitled "Parallel Multiplier that Supports Multiple Numbers with Different Bit Lengths", filed Oct. 21, 1996 describes a multiplier suitable for mantissa pipeline 100 and is incorporated by reference herein in its entirety. The multiplier described in U.S. patent application Ser. No. 08/734,277 is configurable as a 32×32 multiplier for multiplying signed integer values up to 32-bit values or as two 16×16 multipliers or four 8×8 multipliers for multiple simultaneous 16-bit or 8-bit integer multiplications.

Figure 6A:
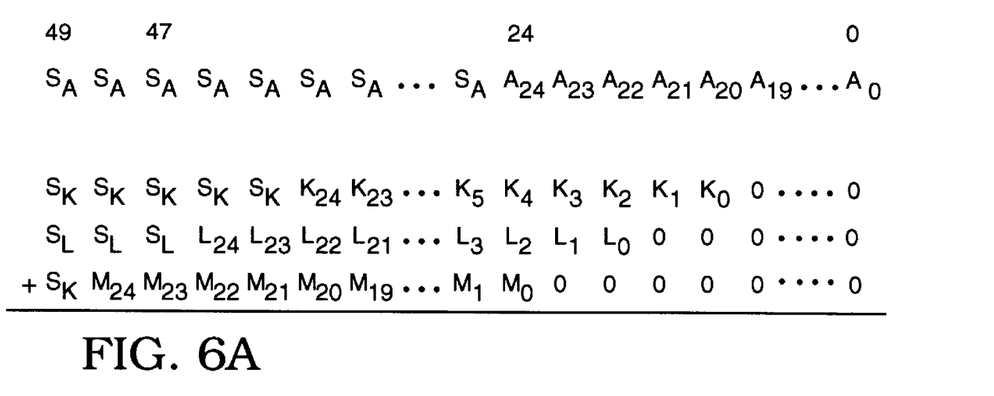
FIGS. 6A and 6B illustrate methods for adding partial products in the multiplier of FIG. 4.

FIG. 6A illustrates an addition performed by adder 440 in a first alternative embodiment of the invention. In FIG. 6A, bits in partial products ppA to ppM are identified as bits $A_0$ ... $A_{24}$ to $M_0$ ... $M_{24}$ and are multiples of the form $\pm 2*2^i*X$. Bits $S_A$ to $S_M$ indicate the sign bit for partial products ppA to ppM. For multiplication of unsigned 24-bit mantissas, partial product ppM is positive and bit $M_{24}$ is zero. In FIG. 6A, each partial product ppA to ppM is sign extended to 50-bits, the bit-length of the product of two 25-bit sign values.

Figure 6B:
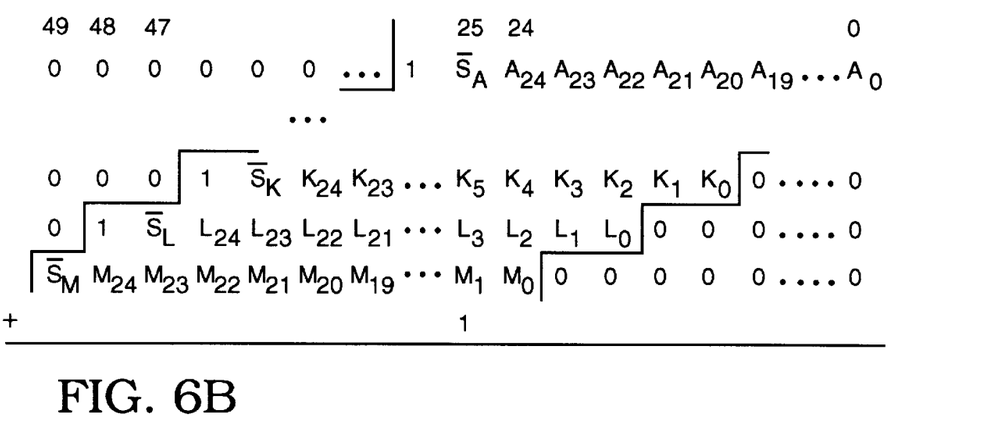

FIG. 6B illustrates an addition performed by adder 440 in an alternative embodiment of the invention. In this alternative, biases are added to the partial products ppA to ppM so that each partial product ppA to ppM is positive and sign extension is not required. For each partial product, the bias adds 11b (binary) to the least significant of the sign bits for partial products ppA to ppL and 1 to the sign bit of partial product ppM. This addition converts the strings of repeated signs $S_A$ to $S_L$ to strings of zeros. The total effect of the bias adds a value containing a series of ones beginning with bit 25 (the bit to the left of $A_{24}$) and extending to bit 49 (the last bit a signed result). An additional term ($1*2^{25}$) is added to the sum so that the net effect of the bias is a carry out from bit 49. The alternative shown in FIG. 6B has the advantage of increasing the number of zero values in the partial products ppA to ppM and simplifying the adder circuitry required in adder 440.

With either alternative embodiment the results from the combination of partial products are 50-bit sum and carry signals SUM and CRY. The result of the multiplication must be positive for mantissa values, but sum or carry signal SUM or CRY can have bit 49 set. Latches 115 and 116 hold values of signals SUM and CRY from multiplier 110 which are passed to latches 131 and 132 in stage 2 of pipeline 100. Each signal SUM and CRY provides a 50-bit value. Each 50-bit value includes the 48 bits which naturally result from multiplying two 24-bit values and two additional bits indicating the sign or encoded sign for signal SUM or CRY.

Figure 7:
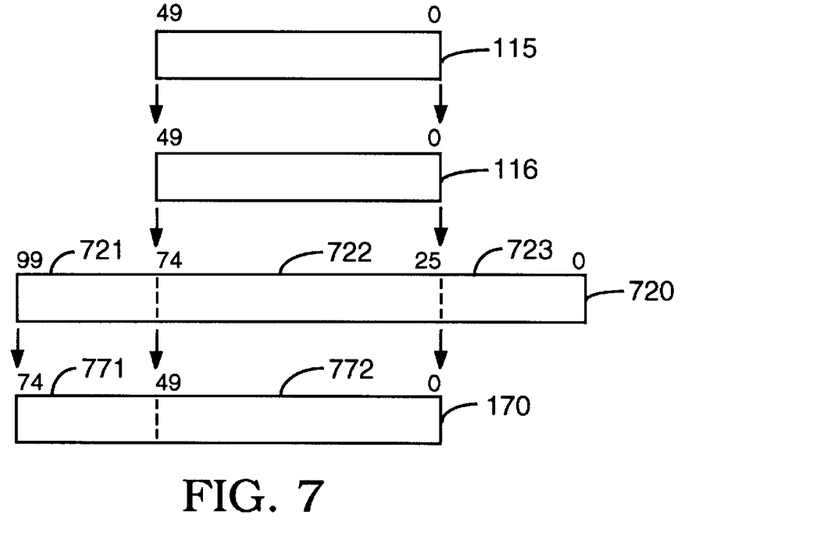
FIG. 7 illustrates the relation that bits from the multiplier have with bits from shifters in an aligner and a normalization circuit of the mantissa pipeline.

Simultaneous with multiplication of Ma and Mb, aligner 120 aligns mantissa Mc for accumulation with the product Ma*Mb. Aligner 120 includes a shifter which in the exemplary embodiment of the invention has a 100-bit data width. FIG. 7 illustrates the alignment of bits in shifter 720 with bits from signals SUM and CRY in latches 115 and 116 respectively. In accordance with an aspect of the invention, shifter 720 performs multiple classes of shift operations, each of which includes two separate shifts. The class of shift operation performed depends on a difference $\delta E = E_c - (E_a + E_b)$ for the exponents Ea, Eb, and Ec of values A, B, and C. Table 2 indicates the five alignment classes.

TABLE 2

Alignment Classes

| Class | Condition | Fixed Shift | Variable Shift |
| --- | --- | --- | --- |
| 1 | $\delta E \geq 27$ | No Shift | No Shift |
| 2 | $27 > \delta E > 0$ | No Shift | Right 27-$\delta E$ |
| 3 | $\delta E = 0$ | right 27 | No shift |
| 4 | $0 > \delta E \geq -48$ | right 27 | Right $|\delta E|$ |
| 5 | $-48 > \delta E$ | right 27 or right 75 | Right 48 or No Shift |

For Table 2, a 24-bit mantissa Mc is left justified when loaded into section 721 of 100-bit shifter 720 before being shifted according to difference $\delta E$ and the class for the MAC operation.

For class 1, mantissa Mc remains in section 721. Accumulation with the product does not change the value of mantissa Mc, and mantissa Mc is the mantissa for the result. The product provides sticky bit which may be used in rounding. For classes 2, 3, and 4, mantissa Mc is shifted so that a portion of mantissa Mc and the product overlap. Class 3 can be considered as a special case of class 2 or 4. In class 3, mantissa Mc is shifted right by 27 bits which aligns the most significant bit of mantissa Mc with the first integer bit of the product because bits 48 and 49 of signals SUM and CRY represent sign information. For class 5, mantissa Mc is shifted into section 723 of shifter 720 where mantissa Mc provides sticky bits used in rounding mantissa generated from the product.

Stage 1 of exponent pipeline 200 determines difference δE and generates control signals as required to properly shift mantissa Mc for accumulation during stage 2. Exponents Ea, Eb, and Ec are excess 127 values according to the IEEE-754 format. Inverters 201, 202, and 203 invert and duplicate respective MSBs of 8-bit signals represent exponents Ea, Eb, and Ec to generate a 9-bit signal format which is the two's complement of Ea−1, Eb−1, and Ec−1. Latches 204 and 205 provide the 9-bit signals representing Ea−1 and Eb−1 to two input ports of an adder 210 which in this embodiment is a carry-save adder. An inverter 207 performs a one's complement of the 9-bit signal representing Ec−1 to apply a signal $\overline{Ec}$ representing −Ec to adder 210. Adder 210 generates a sum signal S0 and a carry signal C0 representing (Ea+Eb)−(Ec+2) or −δE−2. Adders 211, 212, and 213 combine signals S0 and C0 with signals representing 29, 2, and −46 respectively. If δE is greater than 27, a sum S1 from adder 211 is negative. If δE is less than, greater than, or equal to zero, a sum S2 from adder 212 is respectively negative, positive, or zero. If δE is less than −48, a sum S3 from adder 213 is positive.

If δE is less than or equal to 0, range selection circuit 217 asserts a signal ALIGN27 which causes shifter 720 to shift Mc right 27 bits. A multiplexer 218 selects a count for a variable shift. For class 1, the variable shift is zero bits (no shift). For class 2, the variable shift is to the right by 27−δE bits, and sum S1 indicates a count for the shift. For classes 3 and 4, the variable shift is to the right by amount −δE, and sum S2 indicates a count for the shift. In class 5, the second shift is a right shift by 48 bits.

Stage 1 of exponent pipeline 200 also includes an adder 220 with a carry in set to "1" which adds the 9-bit signals representing Ea−1 and Eb−1 to generate a signal representing (Ea+Eb)−1. A multiplexer 222 selects either the signal from adder 220 or the signal representing Ec−1 depending on whether δE is less than or greater than zero. The output signal ER1 from multiplexer 222 is passed through latch 224 to latch 231 in stage 2 of exponent pipeline 200. In stage 2 of exponent pipeline 200, the exponent is incremented and two alternative exponent values ER1 and ER1+3 are passed through latches 232 and 233 to the third stage of exponent stage 200.

The aligned 100-bit mantissa from aligner 120 of mantissa pipeline 100 is stored in a 100-bit latch 126 and from there asserted to a first port of a converter (XOR gate) 128. When the accumulation subtracts value C from product A*B, converter 128 inverts (i.e. performs a one's complement) on the aligned value. Converter 128 then passes the aligned and possibly inverted 100-bit value XC to a latch 133 in stage 2 of pipeline 100.

Stage 2 of mantissa pipeline 100 performs the accumulation of bits aligned with product Ma*Mb from multiplier 110 and passes or increments a portion not aligned with product Ma*Mb. A 3:2 carry-save adder 130 combines 50-bit sum and carry signals SUM and CRY from latches 131 and 132 with matching bits 25 to 74 of signal XC. An adder 140 adds sum and carry signals SUMX and CRYX from adder 130 to generate 50 bits of the result to be passed to stage 3. Adders 130 and 140 must handle an output carry bit which can change bits 75 to 99 of the result. Since product Ma*Mb must be positive even when signal SUM or CRY represents a negative number, a false carry out is generated for cancellation of the sign bit. This false carry should not be combined with bit 75 of signal XC. However, other accumulations generate valid carries which must be combined with bit 75 to obtain a correct result.

Figure 8A:
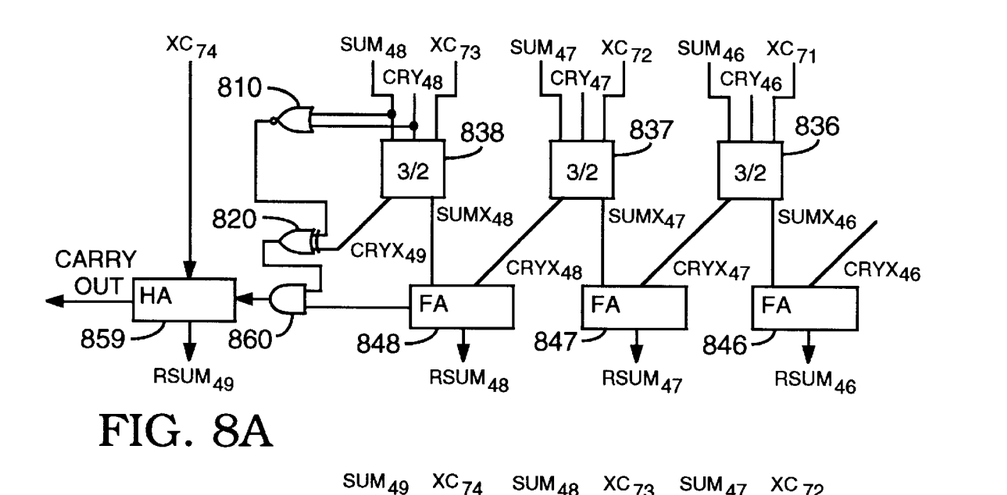
FIGS. 8A, 8B, and 8C are block diagrams of a portion of an adder including carry correction logic in accordance with three alternative embodiments of the invention.

FIG. 8A shows carry correction circuitry in portions of adders 130 and 140 when multiplier 110 generates sum and carry signals SUM and CRY which represent 50-bit signed values as provide by the addition illustrated in FIG. 6A. The portion of adder 130 shown includes three 3:2 carry save adders 836, 837, and 838 which respectively process bits 48, 47, and 46 from signals SUM and CRY and bits 73, 72, and 71 of signal XC. Adder 130 contains similar 3:2 adders for bits 0 to 45 of signals SUM and CRY and bits 25 to 70 signal XC. Adder 130 generates carry and save signals SUMX and CRYX which adder 140 combines to generate a sum RSUM. The portion of adder 140 shown in FIG. 8A includes three full adders 848, 847, and 846 for bits 48, 47, and 46 of sum RSUM. Adder 140 also contains a half adder 859 for bit 49 of sum RSUM. A half adder is sufficient because the sign bits (bit 49) of signals SUM and CRY are ignored and bit 74 of signal XC is only combined with a possible carry.

If signal CRY or SUM from multiplier 110 represents a negative number, addition of signals CRY and SUM generates a carry out from bit 48 to cancel sign bit 49 for the negative partial sum. However, bit 48 of signal CRY (or SUM) is always equal to the sign bit 49 of signal CRY (or SUM) because 50-bit signals CRY and SUM represent a signed value that results from multiplying two 24-bit unsigned values and therefore contain only 48 bits of significant information. The origin of signals CRY and SUM from the product of two unsigned 24-bit numbers places a number of conditions on bits $CRY_{48}$ and $SUM_{48}$. In particular, at most one of bits $CRY_{48}$ and $SUM_{48}$ is 1 because the result of adding signals CRY and SUM must be positive and adding two negative numbers is negative. If either of bits $CRY_{48}$ and $SUM_{48}$ is 1, adding signals CRY and SUM generates a carry bit 49 to cancel the sign bit of the negative value, and a first carry from bit 48 to bit 49 should be ignored as an artifact of signed arithmetic used in multiplier 110. However, if either of bits $CRY_{48}$ and $SUM_{48}$ is 1, a second carry from bit 48 is a valid carry which should cause bit 49 of the result to be incremented.

In accordance with the invention, logic gates 810 and 820 which are associated with adder 838 control an AND gate 860 so that only the carry bits from adder 848 that are not artifacts of signed arithmetic propagate to adder 859. In the embodiment of FIG. 8A, NOR gate 810 has input terminals coupled to receive signals $SUM_{48}$ and $CRY_{48}$ and an output terminal coupled to an input terminal of XOR gate 820. A second input terminal of XOR gate 820 is coupled to the carry output of adder 838, and an output terminal of XOR gate 820 is coupled to an input terminal of AND gate 860. A second input terminal of AND gate 860 is coupled to receive a carry bit from adder 848, and an output terminal of AND gate 860 is coupled to provide a corrected carry bit to adder 859. If bit $SUM_{48}$ or $CRY_{48}$ is 1 (i.e. if one of signals SUM and CRY represents a negative value), output from NOR gate 810 is 0, and adder 838 asserts a first carry $CRYX_{49}$ if bit $XC_{73}$ is 1. Carry $CRYX_{49}$ when asserted causes XOR gate 820 raise one input terminal of AND gate 860 to 1 so that if adder 848 generates a second carry bit that carry bit propagates through AND gate 860 to adder 859. If both bits $SUM_{48}$ and $CRY_{48}$ are 0 (i.e. if signals SUM and CRY represent positive values), the output signal from NOR gate 810 is 1 which causes the output signal from XOR gate 820 to be 1 because adder 838 does not assert bit $CRYX_{49}$. AND gate 860 propagates the carry bit from adder 848 if generated.

The carry correction logic of FIG. 8A can be varied in a variety of ways. For example, NOR gate 810 can be replaced by an XNOR gate because only one of bits $SUM_{48}$ and $CRY_{48}$ can be 1. Also, signal XC indicates whether there is a carry from adder 130 so that carry correction logic can use, for example, bit $XC_{73}$ instead of carry $CRYX_{49}$ when selecting whether to propagate a carry to adder 859. Additionally, carry correction logic can be applied to propagation of a carry bit from bit 49 (i.e. out of adder 140).

Figure 8B:
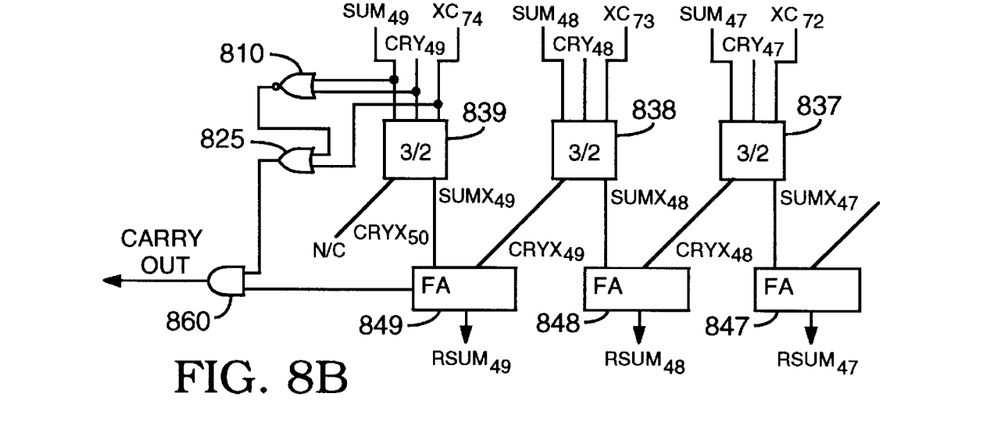

FIG. 8B illustrates an embodiment of carry correction logic for correction of a carry out from adder 140. Carry correction logic in FIG. 8B differs from that of FIG. 8A in that the correction logic is connected to adders associated with bit 49 and XOR gate 820 is replaced with an OR gate 825 having an input terminal coupled to receive bit $XC_{74}$ rather than bit $CRYX_{49}$. Carry bit $CRYX_{50}$ from a 3:2 carry-save adder 839 is not connected. If bit $SUM_{49}$ or $CRY_{49}$ is 1 (i.e. if one of signals SUM and CRY represents a negative value), output from NOR gate 810 is 0, and the output signal from OR gate 825 is 1 only if signal $XC_{74}$ is 1. Accordingly, if one of signals SUM and CRY represents a negative value, AND gate 860 propagates a carry from adder 849 only if bit $XC_{74}$ is 1 causing a false carry from adder 839. If both bits $SUM_{49}$ and $CRY_{49}$ are 0 (i.e. if signals SUM and CRY represents positive values), the output signal from NOR gate 810 is 1 which causes the output signal from OR gate 825 to be 1, and AND gate 860 propagates a carry from adder 849 if a carry is generated.

If multiplier 110 uses sign corrected partial products such as illustrated in FIG. 6B, addition of signals SUM and CRY can result in a carry from bit 49. Carry correction logic such as shown in FIGS. 8A and 8B also corrects for the carry for sign corrected partial products. For example, if one or both of bits $SUM_{49}$ and $CRY_{49}$ are 1, the first carry from bit 49 should be ignored as an artifact of sign correction and only the second carry should be propagated out of adder 140. If neither bit $SUM_{49}$ nor $CRY_{49}$ is 1, any carry from bit 49 should be propagated out of adder 140. The carry correction logic of FIG. 8B performs exactly this function. The carry correction logic of FIG. 8A can also be used without adder 859 if gates 810, 820, and 860 are coupled to adders 839 and 849 for bit 49 rather than adders 838 and 848 for bit 48.

Figure 8C:
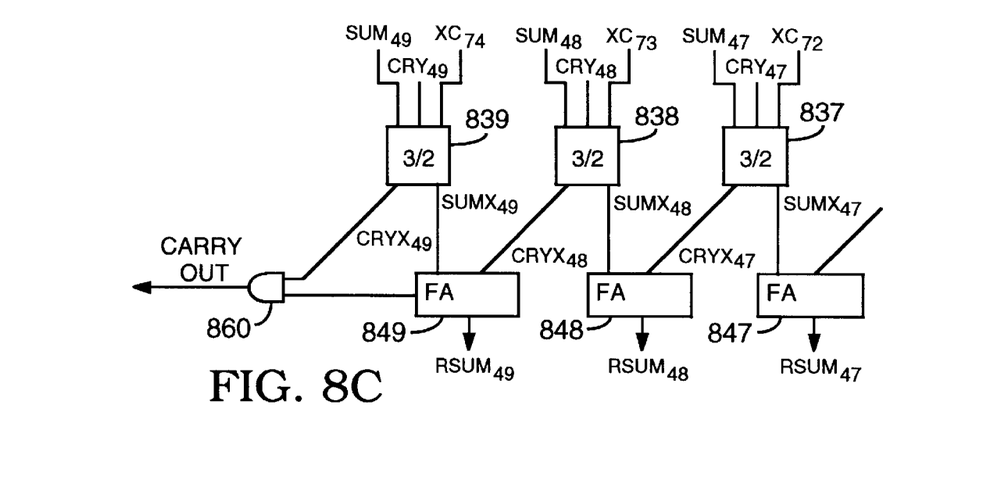

FIG. 8C shows an embodiment of the invention where carry correction logic includes only AND gate 860. This embodiment of the invention is usable with multipliers where the carry out associated with sign correction cannot be generated when combining partial products to create signals SUM and CRY. For a multiplier with a Wallace tree adder such as shown in FIG. 5 a carry out from bit 49 never occurs when generating the sum and carry signals SUM and CRY. With such an adder, at least one of bits $SUM_{49}$ and $CRY_{49}$ is equal to 1, and a false carry is always generated when adding signals SUM, CRY, and XC. AND gate 860 generates an output carry bit only if two carry bits are generated one from adder 839 and one from adder 849.

The corrected carry out may change bits 75 to 99 of signal XC from latch 133. Stage 2 of mantissa pipeline 100 includes a data path 160 for transfer of either the most significant 25 bits or the least significant 25 bits of signal XC to stage 3. In data path 160, a multiplexer 161 selects either the least significant bits or the most significant bits depending on the size of value C relative to product A*B. The most significant bits are selected for alignment classes 1 and 2. For classes 3, 4, and 5 accumulation cannot generate a carry out to bit 75, but for alignment classes 1 and 2, a carry out from adder 140 may require that an incrementer 162 increment the most significant bits 75 to 99. For classes 3, 4, and 5, when value Mc is one's complemented by XOR 128, incrementer 162 completes the two's complement conversion. Accordingly, output of multiplexer 161 is coupled to incrementer 162 and to an input of a multiplexer 163. Incrementer 162 adds one to a 25-bit input value from multiplexer 161 and provides the sum to a second input of multiplexer 163. Multiplexer 163 selects the incremented value when there is a carry out bit from adder 140 in class 1 and 2 or when mantissa Mc was one's complemented in classes 3, 4, and 5. Multiplexer 161 selects the least significant bits of signal XC when value C is less than the product A*B, and these least significant bits indicate a value STICKYA for rounding of the result. The selected bits from multiplexer 163 pass through a latch 165 to a latch 171 in stage 3 of the pipeline.

In addition to adders 130 and 140 and the data path 160, stage 2 of mantissa pipeline 100 contains a leading one/zero anticipator 150. Co-owned U.S. patent application Ser. No. 08/730,922, attorney docket No. M-4408, entitled, "LEADING ZERO COUNT CIRCUIT", filed Oct. 18, 1996, and co-filed U.S. patent application Ser. No. 08/746,880, entitled "Combined Leading One and Zero Anticipator" describe a leading zero anticipator and a leading one/zero anticipator suitable for use in pipeline 100. Leading one/zero anticipator 150 anticipates a count LZWA of leading (i.e. consecutive most significant) identical bits in the range corresponding to the product generated by multiplier 110. Count LZWA is stored in latch 151 and from there passes to latch 173 in stage 3 of mantissa pipeline 100.

Stage 3 contains a normalization circuit which includes a shifter 170 and control logic 176. The normalization circuit performs a coarse normalization of the mantissa determined in stage 2. 75 bits from stage 2 are loaded into shifter 170 according to the correspondence illustrated in FIG. 7. In particular, 50 bits from adder 140, latch 141, and latch 172 are loaded into a central section 772 of shifter 170. 25 bits from latch 171 are loaded into section 771 of shifter 170.

According to the IEEE-754 data format the mantissa for the result has a 24-bit normalized form where the most significant bit is an implied 1 and 23 bits represent the fractional portion of the mantissa. Shifter 170 left shifts loaded values until a most significant non-sign bit is aligned with bit 74 of shifter 170. In accordance with an aspect of the invention, MAC operations are divided into normalization classes according to differences δE which is Ec−(Ea+Eb) and shifter 170 performs a shift selected according to the normalization class. Table 3 indicates the normalization classes and a shift count required to properly normalize the resultant mantissa.

TABLE 3

| Normalization Classes | | |
|---|---|---|
| Class | Condition | Normalization Shift Count |
| 1 | δE ≧ 27 | No Shift |
| 2 | 27 > δE > 0 | 27 − δE + LZWA |
| 3 | δE = 0 | 27 + LZWA |
| 4 | 0 > δE ≧ −48 | 27 + LZWA |
| 5 | −48 > δE | 27 |

Normalization control logic 176 uses count LZWA, difference δE, and the normalization class for the MAC operation to select the shift required for a coarse normalization. For class 1, value C is much greater than product A*B so that bits in mantissa Mc are effectively the resultant mantissa. Bits in section 772 are less significant than any bit of Mc and are not necessarily in the correct position to indicate their significance relative to mantissa Mc. For this class, the 25 bits in section 721 include mantissa Mc left aligned with bit 99, and no shift is required for normalization.

For normalization class 2, bits from mantissa Mc may be in section 771 but mantissa Mc is not left aligned with bit 99. Bits from multiplier 110 either overlapped and changed the least significant bits in mantissa Mc and are in their correct position relative to bits in mantissa Mc. A carry can from the least significant bits can shift the most significant bit left by one bit. A left shift by 27−δE bits left aligns the most significant bit from mantissa Mc if difference δE is greater than 1. Fine normalization described below accounts for this case. If δE=1, accumulation can cancel the most significant bit of mantissa Mc, and a further shift according to the leading zero/one count is required.

For classes 3 and 4, the most significant bit of mantissa Mc is of less or equal significance to the most significant bit of the product from multiplier 110. If the most significant bit of product Ma*Mb is not changed by accumulation with mantissa Mc, bit 72 in shifter 170 (i.e. bit 47 from latch 172) is the most significant bit of the resulting mantissa and a left shift 27 is required for a coarse normalization. However, cancellation between product Ma*Mb and mantissa Mc can create a run of leading zeros for a positive result or a run of leading ones for a negative result and a further left shift as indicated by count LZWA is required for left alignment in shifter 170.

For class 5, product A*B is much greater than value C so that no significant cancellation can occur. Mantissa Mc can be ignored except possibly for rounding. Bit 72 in shifter 170 (i.e. bit 47 from latch 172) is the most significant bit of the resulting mantissa and a left shift by 27 bits is performed for a coarse normalization.

The 25 most significant bits from shifter 170 after coarse normalization pass from shifter 170 to a converter 177. If the result is negative, converter 177 performs a one's complement to convert the result, and a signal SIGN_MAN is passed to stage 3 of sign pipeline 300 (FIG. 3) to indicate the sign of the mantissa before conversion.

Rounding logic 180 determines from the immediately adjacent bits and from sticky bits whether the mantissa should be incremented (rounded up) or not. A rounding mode signal R_MODE and a rounding sign signal R_SIGN can select the type of rounding performed consistent with the IEEE-754 standard. Rounding logic 180 is not critical to the present invention, and rounding logic 180 can be any type of rounding logic known in the art.

Shift logic 191 shifts the coarsely normalized mantissa left by one bit to remove the implied 1 (most significant bit), and a multiplexer 192 selects either the shifted or unshifted version of the mantissa. In particular, if the MSB of the coarsely normalized mantissa is zero, multiplexer 192 selects the unshifted version since coarse normalization already removed the most significant bit, and a signal is sent to stage 3 of exponent pipeline 200 to indicate exponent correction is required. An incrementer 193 increments the mantissa selected by multiplexer 192, and a multiplexer 194 selects either the incremented value from incrementer 193 or the unincremented value from multiplexer 192 depending on how the mantissa is to be rounded and whether the mantissa was negative before conversion by converter 177. If incrementing causes a carry, a signal is sent to exponent pipeline 200. A final multiplexer 195 selects the output mantissa value RT which is the calculated mantissa from multiplexer 194, a maximum value MAX, or a minimum value "0" if exponent pipeline 200 detects an exponent overflow or underflow.

Stage 3 of the exponent pipeline 200 includes a first multiplexer 240 with an output signal ER2 which is exponent value ER1 if the MAC operation is class 1 or 2 or ER1+3 if the MAC operation is class 3, 4, or 5. To correct for cancellation that accumulation causes for normalization classes 3, 4, and 5, a multiplexer 253 selects the inverse of count LZWA from latch 173, and adders 251 and 252 subtract count LZWA from exponent ER2. For normalization classes 1 and 2, multiplexer 253 selects "0", and adders 251 and 252 add 0 to exponent ER2. Adders 251 and 252 differ in that adder 251 has an input carry and generates a sum one greater than the sum generated by adder 252. Multiplexer 260 has an output signal ER3 selected from the output signals of adder 251 or 252 according to whether fine normalization in the mantissa pipeline 100 selects the output value from shift logic 191. An incrementer 271 corrects the exponent when incrementer 193 caused a carry. An inverter 273 convert ER3 from the two's complement format to the excess 127 format required for exponents under the IEEE-754 data type. Exception detection logic 280 detects exponent underflow and overflow conditions.

FIG. 3 shows sign pipeline 300. Stage 1 of sign pipeline 300 includes input latches 301 to 306, XOR gates 310 and 311, and output latches 321 to 325. Input latches 301, 302, and 303 store respective sign bits SA, SB, and SC of values A, B, and C. Input latches 304, 305, and 306 store signals MPY, FMODE, and ABSUBC respectively indicating a multiply operation, that the MAC unit is operating in difference mode (i.e. adding when signs for A*B and C differ or subtracting when signs for A*B and C are the same), and whether accumulation subtracts value C from product A*B. XOR gate 310 has input terminals coupled to latches 301 and 302 and generates a signal SP which is 0 if product A*B is positive and 1 if product A*B is negative. XOR gate 311 has input terminals coupled to latch 303 and the output terminal of XOR gate 310 and generates a signal DIFF_SIGN which is 0 (or 1) if product A*B and value C have the same sign (or not). Output latches 321 to 325 pass signals SP, DIFF_SIGN, MPY, FMODE, and ABSUBC to stage 2.

Stage 2 of sign pipeline 300 contains input latches 341 to 345 and output latches 341 to 345 which pass signals SP, DIFF_SIGN, MPY, FMODE, and ABSUBC to input latches 351 to 355 in stage 3 in synchronization with progress of the MAC operation through pipelines 100 and 200. In stage 3, multiplexers 361 to 363 select resultant sign SR which is either signal SP or signal $\overline{SP}$, which is the complement of signal SP. Multiplexer 361 selects signal SP if FMODE and DIFF_SIGN are zero, selects an output signal from multiplexer 362 if FMODE is equal to 1, and selects and output signal from multiplexer 363 if FMODE is not equal to 1.

Although the invention has been described with reference to particular embodiments, the description is only an example of the invention's application and should not be taken as a limitation. In particular, even though much of preceding discussion was aimed at the IEEE-754 data format, alternative embodiments of this invention apply to other floating point data formats. For the other formats, bit positions described for the exemplary embodiment vary in a manner which will be well understood in the art. Various other adaptations and combinations of features of the embodiments disclosed are within the scope of the invention as defined by the following claims.

We claim:

1. A multiply-and-accumulate unit comprising:

a multiplier having a first output port and a second output port respectively for a first output signal and a second output signal, wherein a sum of values represented by the first and second output signals is equal to a product of first and second values to be multiplied by the multiplier;

a first adder which comprises a carry-save adder having a first input port and a second input port respectively coupled to the first output port and the second output port of the multiplier, a third input port coupled to receive a first portion of a data signal representing a third value to be accumulated with the product, and a first output port and a second output port respectively for sum bits and carry bits generated by the carry-save adder;

a second adder having first and second input ports coupled to the first and second output ports of the carry-save adder; and logic coupled to the first and second adders to suppress a carry bit which results from addition of the values represented by the output signals from the multiplier and propagate the carry bit if otherwise generated by the first and second adder, wherein the logic comprises:

an AND gate having a first input terminal coupled to the first adder, a second input terminal coupled to a carry output from the second adder, and an output terminal for the carry bit which the logic propagates;

a first logic gate having first and second input terminals respectively coupled to the first and second input ports of the carry-save adder; and a second logic gate having a first input terminal coupled to an output terminal of the first logic gate and an output terminal coupled to an input terminal of the AND gate.

2. The multiply-and-accumulate unit of claim 1, wherein the second logic gate is an XOR gate and has a second input terminal coupled to a most significant bit of the second output port of the carry-save adder.

3. The multiply-and-accumulate unit of claim 2, wherein the first logic gate is a NOR gate.

4. The multiply-and-accumulate unit of claim 1, wherein the second logic gate is an OR gate and has a second input terminal coupled to the third input port of the carry-save adder.

5. The multiply-and accumulate unit of claim 4, wherein the first logic gate is a NOR gate.

* * * * *